(12) United States Patent  (10) Patent No.: US 8,196,980 B1
Banks  (45) Date of Patent: Jun. 12, 2012

(54) PET WASTE CLEAN-UP DEVICE

(76) Inventor: Joyce A. Banks, Brooklyn, NY (US)

( * ) Notice: Subject to any disclaimer, the term of this patent is extended or adjusted under 35 U.S.C. 154(b) by 0 days.

(21) Appl. No.: 13/006,092

(22) Filed: Jan. 13, 2011

Related U.S. Application Data

(60) Provisional application No. 61/342,000, filed on Apr. 8, 2010.

(51) Int. Cl.
*A01K 29/00* (2006.01)
(52) U.S. Cl. .......................... 294/1.3; 194/185
(58) Field of Classification Search .................... 294/1.3, 294/1.4, 1.5, 185
See application file for complete search history.

(56) References Cited

U.S. PATENT DOCUMENTS

| | | | | |
|---|---|---|---|---|
| 4,185,355 | A | * | 1/1980 | Williams ......................... 15/344 |
| 5,174,620 | A | * | 12/1992 | Huegelmeyer et al. ......... 294/1.3 |
| 7,077,172 | B2 | * | 7/2006 | Perkitny et al. ................. 141/10 |
| 7,226,098 | B1 | * | 6/2007 | Moreira .......................... 294/1.4 |
| 7,270,157 | B2 | | 9/2007 | Perkitny ......................... 141/114 |
| 7,293,810 | B2 | * | 11/2007 | Lopoukhine et al. .......... 294/1.4 |
| 2003/0146631 | A1 | * | 8/2003 | Stoev .............................. 294/1.4 |
| 2008/0030032 | A1 | * | 2/2008 | Gill ................................. 294/1.3 |
| 2010/0176611 | A1 | * | 7/2010 | Merino-Garcia .............. 294/1.3 |

* cited by examiner

*Primary Examiner* — Saul Rodriguez
*Assistant Examiner* — Gabriela Puig
(74) *Attorney, Agent, or Firm* — Bay State IP, LLC; Adam J. Bruno; Janine D. Geraigery

(57) ABSTRACT

A clean-up device for picking-up, containing, and disposing of pet waste. The device includes a handbag for housing a liner feeding mechanism, motor-vacuum, and suction hose. The liner feeding mechanism positions a liner over an opening of the handbag. The suction hose is actuated by the motor-vacuum and inwardly pulls the liner with waste into the suction hose. The motor-vacuum sanitarily shrink wraps the liner around the waste. Once wrapped, the waste is disposed of directly into a trash receptacle. The handbag includes a telescoping handle including buttons which electronically communicate with a control panel to actuate the motor-vacuum, suction hose, and liner feeding mechanism. While in use, a user simply places the opening of the handbag directly over waste and presses the buttons to pick-up, wrap, and dispose of waste in a safe, efficient, and sanitary manner.

8 Claims, 3 Drawing Sheets

PET WASTE CLEAN-UP DEVICE

CROSS REFERENCES AND RELATED SUBJECT MATTER

This application claims the benefit of provisional patent application Ser. No. 61/342,000, filed in the United States Patent Office on Apr. 8, 2010.

BACKGROUND OF THE INVENTION

1. Field of the Invention

This invention relates generally to waste removal, and more particularly, to a pet waste clean-up device for facilitating sanitary and easy clean-up of pet waste. The pet waste clean-up device is a uniquely designed, hand-held, and portable handbag having a suction hose, motor-vacuum and a liner feeding mechanism housed therein for picking-up, containing and disposing pet waste with just a push of a button.

Pets, and especially dogs, are important additions to the family household. However, cleaning up after a pet is an onerous task for many. In particular, picking up and disposing of pet waste is an unsettling task that must be done to keep lawns, sidewalks, and streets clean. Pet owners that live in cities and suburban areas are mandated by laws and local ordinances to clean up after their dogs by immediately removing waste from sidewalks and lawns. Owners that live in less populated areas, often have to remove waste in order to keep their front and backyards well-kept and clean. Many pet owners collect waste in either a plastic or paper bag. Collecting waste by hand even with the use of a plastic bag is an unsanitary and disagreeable chore. Many pet owners are embarrassed to pick up waste on the sidewalk or often forget to bring a paper or plastic bag when walking their pet. In most cases, pet owners do not wish to manually handle pet waste.

Pet owners also have the option of utilizing a pet scooping device. However, while pet scooping devices offer a hands-free means of picking up after one's pet, the handles of a pet scooping device are often short requiring the owner to lean over or bend down to the ground to retrieve the waste. For those with physical limitations, bending or stooping over can cause pain and discomfort. Therefore, it is problematic for those with back and knee problems to use a pet scooping device. There is a need for a hand-held, sanitary, and portable device for pet owner's to easily and efficiently retrieve and dispose of waste.

2. Description of the Related Art

U.S. Pat. No. 7,077,172 to Perkitny discloses a waste collection device including a body including a housing defining an opening. The housing opening allowing an open end of an associated bag to be folded thereover and a housing receiving a closed end of the associated bag therein. A pulling mechanism is connected to the body and removably connected to the associated bag for selectively pulling the associated bag into the housing. To use, the open end of the bag is positioned adjacent waste material to be collected. The pulling mechanism then pulls the bag into the housing and the waste material is simultaneously transferred into the bag.

U.S. Pat. No. 7,270,157 to Perkitny discloses an improved waste collection device including a body having a housing defining an opening which allows an open end of an associated bag to be folded thereover. The housing receives a closed end of the associated bag therein. A spool is rotatably connected to the body and removably connected to the associated bag. A driving mechanism is connected to the spool for selectively rotating the spool thereby pulling the associated bag into the housing.

U.S. Pat. No. 7,293,810 to Lopoukhine discloses a sanitary refuse collecting and pouching device having an actuator handle and housing unit that can be configured to have a movement mechanism, material shaft rollers for dispensing replaceable collection pouch material, formation rollers and a cutting unit. The movement mechanism drives the formation rollers causing the refuse to be enveloped and sealed in the collection pouch material. The cutting unit thereafter severs the sealed pouch, which can be stored in the housing unit until disposed.

While these units may be suitable for the particular purpose employed, or for general use, they would not be as suitable for the purposes of the present invention as disclosed hereafter.

SUMMARY OF THE INVENTION

It is an object of the invention to provide a sanitary, efficient, and practical way for owners to completely remove odiferous pet waste. Accordingly, the present invention is a pet waste clean-up device including a handbag housing a suction hose, a motor-vacuum, and a liner feeding mechanism to pick-up and dispose of pet waste.

It is an object of the invention to provide an easily transportable device. Accordingly, the handbag of the present invention includes a handle for easily carrying the device while walking a dog along the street or picking up after a dog in a yard.

It is an object of the invention to provide a pet waste clean-up device which may couple to either the leash of the pet or the belt of the owner. Accordingly, in alternate embodiments, the handbag of the present invention includes a clip fastener to allow the handbag to secure to the leash of the pet or belt of the owner for ease of transportation when walking or cleaning-up after a pet.

It is an object of the invention to provide one means capable of both picking-up and disposing of pet waste. Accordingly, the suction hose, motor-vacuum, and liner feeding mechanism housed within the handbag of the present invention completes both tasks by electronically picking-up, sanitarily wrapping, and disposing of waste directly into a trash receptacle without the need for multiple devices or steps.

It is an object of the invention to provide a means capable of picking-up and disposing of waste that simultaneously eliminates the need for manually handling the waste. Accordingly, the suction hose, motor-vacuum, and liner feeding mechanism housed within the handbag of the present invention pick-up, sanitarily wrap, and dispose of the waste directly into a trash receptacle without the need for the user to ever manually handle waste.

It is another object of the invention to sanitarily pick-up and discard pet waste. Accordingly, the present invention utilizes a liner feeding mechanism including polymer film liners which are pulled inwardly into suction hose with the waste contained therein. Heat is added to shrink and wrap the liner around the waste to fully enclose the waste and protect the handbag to dispose of the waste in the most sanitary means possible.

It is yet another object of the invention to provide a pet waste clean-up device which does not require cleaning or excessive maintenance. Accordingly, the liners of the liner feeding mechanism are uniquely designed such that when the liner is pulled inwardly into the suction hose, the liner insulates the head of the suction hose and protects the suction hose from coming in contact with waste. Since the waste is picked-up and disposed of through the head of the suction hose, no other component of the device ever comes into contact with the waste, which therefore entirely eliminates the need for cleaning.

It is an object of the invention to provide a device suitable for use by handicap, elderly, and those with back injuries, which eliminates the need to bend down or stoop over to clean-up pet waste. Accordingly, the handle of the handbag of the present invention is telescoping such that the handle extends upwardly allowing the user to place the handbag directly over the waste on the ground surface without the need to bend down or stoop over to pick-up and dispose of waste.

It is another object of the invention to provide an easy to use waste clean-up device. Accordingly, the handbag of the present invention includes buttons which electronically communicate with a control panel for operating the motor-vacuum, suction hose, and liner feeding mechanism. The user simply presses the buttons and the pet waste is automatically picked-up and disposed into a trash receptacle.

It is another object of the invention to provide a means for replaceably positioning liners so that the device is capable of repeated use. Accordingly, the liner feeding mechanism of the present invention includes spools and brackets to hold and position one liner at a time above the opening on the bottom end of the handbag for each successive use.

It is an object of the invention to provide an esthetically pleasing pet waste clean-up device. Accordingly, the handbag is designed as a fashionable and esthetically pleasing handbag similar to popular handbags women carry for daily use. Furthermore, the handbag is also designed to resemble popular duffel bags such that men walking their pets may also carry the device.

It is an object of the invention to provide a portable device so as to allow dog owners to easily and efficiently pick-up waste while walking their dogs. Accordingly, the present invention is battery operated for ease of use while walking a pet or cleaning-up after a pet.

It is an object of the invention to provide an inexpensive pet waste removal device for pet owners. Accordingly, the components of the present invention including the handbag, suction hose, motor-vacuum, and liner feeding mechanism are inexpensive to manufacture.

This invention is a clean-up device for picking-up, containing, and disposing of pet waste. The device includes a handbag for housing a liner feeding mechanism, motor-vacuum, and suction hose. The liner feeding mechanism positions a liner over an opening of the handbag. The suction hose is actuated by the motor-vacuum and inwardly pulls the liner with waste into the suction hose. The motor-vacuum sanitarily shrink wraps the liner around the waste. Once wrapped, the waste is disposed of directly into a trash receptacle. The handbag includes a telescoping handle including buttons which electronically communicate with a control panel to actuate the motor-vacuum, suction hose, and liner feeding mechanism. While in use, a user simply places the opening of the handbag directly over waste and presses the buttons to pick-up, wrap, and dispose of waste in a safe, efficient, and sanitary manner.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
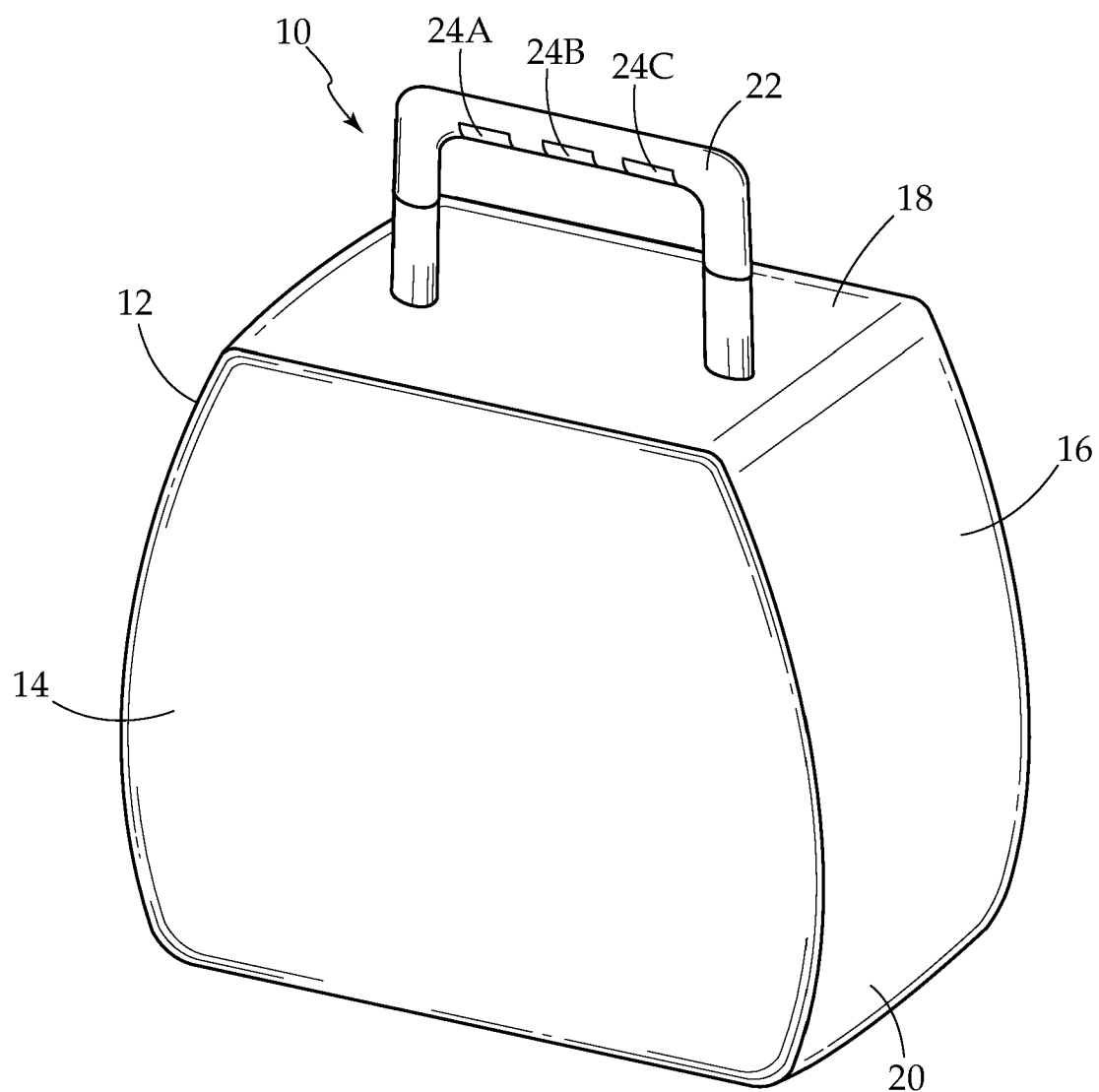
FIG. 1 is a diagrammatic perspective view of the pet waste clean-up device of the present invention including a handbag for easy, efficient and sanitary removal of dog waste.

Family pets are important additions to any household. However, pet waste removal is an onerous task especially when having to manually handle and remove pet waste. The present invention is ideal for dogs, however may be utilized for a variety of animals requiring removal of waste. FIG. 1 illustrates the present invention, which is a pet waste clean-up device 10 for an easy, efficient, and sanitary way to pick-up and dispose of waste without having to bend down and manually handle the waste 61. The device 10 is hand-held, specially designed, and portable. In its broadest context the device 10 includes a handbag 12 housing a suction hose 50, liners 60, and a motor-vacuum 80 therein.

In the preferred embodiment, the handbag 12 is substantially rectangular measuring approximately six inches (6") in length and eight inches (8") in width. Other measurements are contemplated to suit the owner's preference. The handbag 12 is preferably made from durable material such as cotton, leather, polyester, denim, linen, or other like materials. The handbag 12 is uniquely designed to resemble esthetically pleasing and fashionable bags utilized for daily use by women. The handbag 12 has an outside surface 14 and in alternate embodiments, rhinestones, decorative flowers, clasps or other decorative features are positionable upon the outside surface 14 to increase the aesthetics of the handbag. In alternate embodiments, the handbag 12 resembles duffel bags or overnight bags to resemble daily bags utilized by men. The handbag 12 includes a body 16 wherein the suction hose, liners, motor-vacuum, and a battery unit are housed.

The handbag 12 has a top end 18 and an opposing bottom end 20. A handle 22 integrally couples to the top end 18 of the handbag 12 for facilitating ease of transportation. The handle 22 is made from the same durable material as the handbag 12. In the preferred embodiment, the handle 22 is elongated and contoured to allow the user to comfortably hold the handbag 12. Preferably, the handle 22 is telescoping such that the handle 22 extends outwardly away from the handbag 12 to efficiently extend the device 10 downward to the ground and pick-up waste without the need to bend down. In alternate embodiments, a durable clip fastener 23 is coupled to the outside surface 14 of the handbag 12 to secure the handbag 12 to the leash of the pet or to the belt of the owner.

In the preferred embodiment, the handle 22 includes a plurality of buttons 24. Preferably three buttons 24, a first button 24A, second button 24B, and third button 24C serve as switches for controlling the device 10 during removal of waste 61. In alternate embodiments, the buttons 24 are positionable upon the outside surface 14 of the handbag 12.

The bottom end 20 of the handbag 12 includes an opening 32 which is substantially circular for suctioning the waste 61 into the handbag. The opening 32 is approximately ten inches (10") in circumference; however other dimensions are contemplated. The opening 32 has an outer lip 34 having a hinge 36 coupled thereto. The outer lip 34 also includes a clasping mechanism opposing the hinge 36 to allow for sealing the handbag 12 when the device 10 is not in use.

A door 40 having similar dimensions as the opening 32 acts to seal the handbag 12 when the device 10 is not operating. The door 40 is made from plastic or other lightweight material. The door 10 includes an exterior having a knob. The door 40 couples to the outer lip 34 of the opening 32 via the hinge 36. The door has 40 an opened position 40A and a closed position 40B. The door 40 is in the closed position 40B when the door 40 is flush adjacent to the clasping mechanism. The clasping mechanism keeps the door 40 in the closed position 40B by attaching the door 40 to the outer lip 34 of the opening 32. The door 40 is in the opened position 40A when the door is pulled outwardly, away from the clasping mechanism by using the knob. The hinge 36 allows the door 40 to freely swing away from the clasping mechanism. Allowing the door 40 to swing freely from an opened 40A to a closed position 40B allows the user to position the door 40 in the opened position 40A when the device 10 is ready for use. Furthermore, positioning the door 40 in the closed position 40B allows the user flexibility when either walking towards a trash receptacle to deposit the waste 61, or when the device 10 is not in use.

A control panel 28 is housed within the handbag 12 and is similar to an electric circuit well known in the art. The buttons 24 of the handle 22 are in electronic communication with the control panel 28 such that the user may press the first, second, or third buttons 24A, 24B, 24C thereby actuating the control panel 28, and thus causing the device 10 to retrieve and dispose of the waste. Specifically, when the user presses the first button 24A an electronic signal is sent to the control panel 28 actuating a new liner 60 positionable over the opening of the handbag. Upon pressing the second button 24B, an electronic signal is sent to the control panel 28 to actuate the motor-vacuum and cause the device 10 to pick-up the pet waste through the opening 32 of the handbag 12 and wrap the waste within a liner 60. Upon pressing the third button 24C, an electronic signal is sent to the control panel 28 to actuate the motor-vacuum 80 to dispose of the pet waste into a trash receptacle.

A battery unit 30 is also housed within the handbag 12 for providing power to the motor-vacuum 80 and liner feeding mechanism 62. In the preferred embodiment, an alternate current (AC) battery unit is utilized. In alternate embodiments, direct current (DC) or a rechargeable battery pack is contemplated. Preferably, the control panel 28 and battery unit 30 are mounted on the inside surface 26 of the handbag 12; however other positions are contemplated such that the buttons 24 and battery unit 30 are in electronic communication with the control panel 28.

Figure 2:
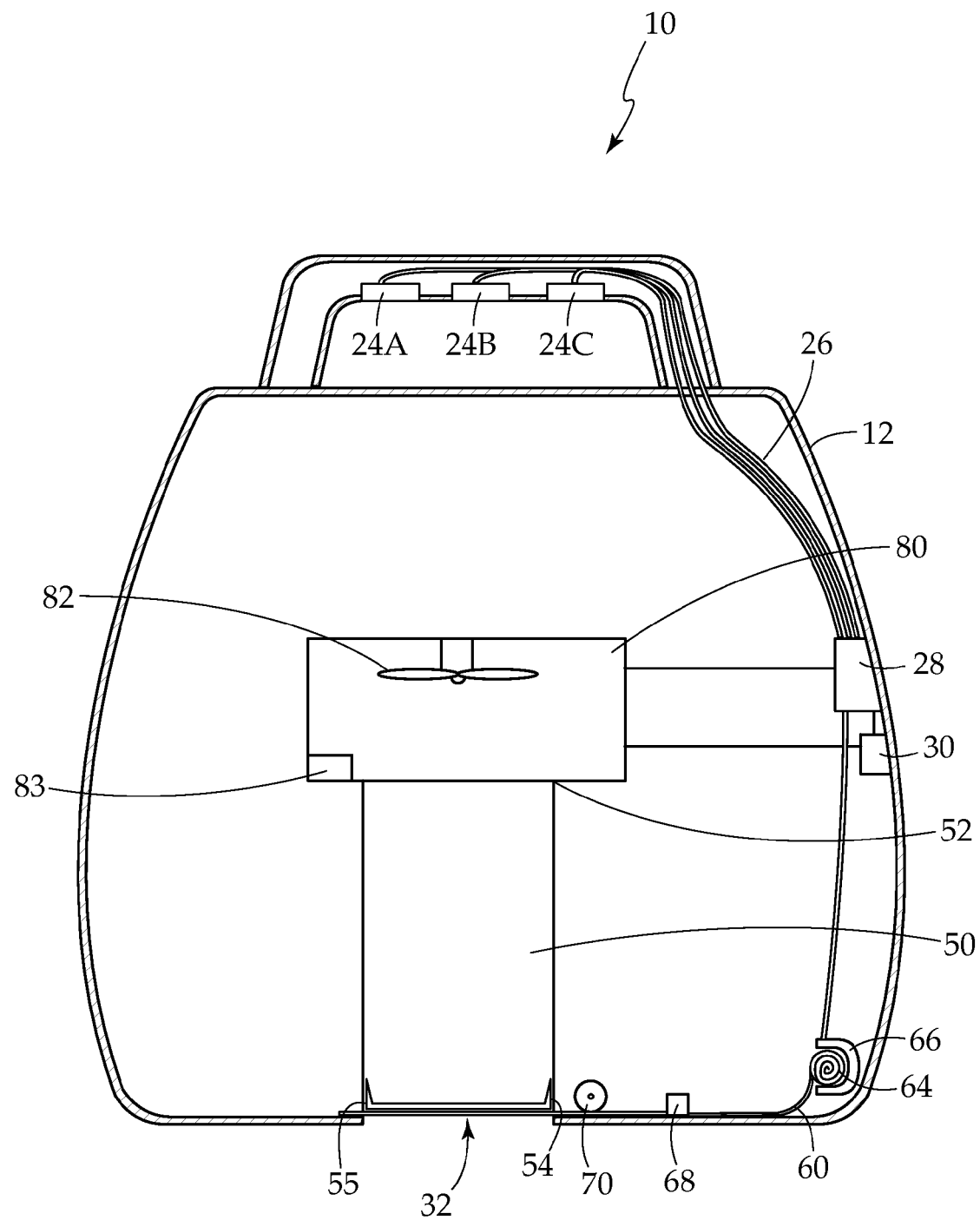
FIG. 2 is a cross-sectional view of the handbag of the present invention having a suction hose, liner feeding mechanism, and motor-vacuum housed therein.

A suction hose 50, shown in FIG. 2, is positionable within the body of the handbag. The suction hose 50 is flexible and removable and includes a coupled end 52 and a free end 54. The coupled end 52 couples the suction hose 50 to the motor-vacuum 80. The free end 54 has a preferably plastic head 55 adjacent the opening 32 of the handbag 12. Preferably, the head 55 is positionable directly above the opening 32 such that when the device 10 is actuated the waste is suctioned directly into the suction hose 50 through the head 55 of the free end 54. The suction hose 50 is substantially cylindrical and preferably slightly smaller in circumference to the opening 32. In the preferred embodiment, the suction hose 50 is four inches (4") in height. Other measurements are contemplated as the dimensions of the handbag 12 may vary.

The liner feeding mechanism 62 is also housed within the body 16 of the handbag 12. The liner feeding mechanism 62 includes liners 60 which are rolled and attached to a spool 64 held into position by a first bracket 66 along the inside surface 26 of the handbag 12. The liners 60 are made from polymer plastic film material well known in the art. The liners 60 resemble substantially rectangular flat sheets. The liners 60 are uniquely designed to fit completely over the opening 32 such that when the suction hose 50 retrieves the waste 61, the liner is pulled upwardly into the suction hose 50 and completely covers the entire suction hose 50 thereby fully barricading the waste within the liner, such that the waste never comes into contact with the opening 32, head 55, suction hose 50, or any other component of the device 10. Once the liner 60 is pulled upwardly into the suction hose 50, the liner 60 is positionable similar to a trash can liner which completely covers and protects a trash can. The liner 60 in a similar manner protects the suction hose 50 and all adjacent components of the device 10 from the waste, thereby eliminating the need for cleaning the device 10.

The liners 60 are positionable above the opening 32 by the liner feeding mechanism 62. The spool 64 rotates and allows the liners 60 to extend horizontally across the opening 32 one at a time. Preferably, each liner 60 is removably coupled to one another by perforated edges (not shown). In the preferred embodiment, a second bracket 68 is positionable along the inside surface 26 of the handbag 12, such that the liners 60 are threaded through the second bracket 68 to secure within the body 16 of the handbag 12. Preferably, a roller 70 is positionable along the inside surface 26 of the handbag 12 adjacent the opening 32. The spool 64 and the roller 70 are in communication with one another through the control panel and act in conjunction, such that the liner 60 is deposited directly above the opening 32. Upon pressing the first button 24A, an electronic signal is sent to the control panel 28 which actuates the liner feeding mechanism 62 and the liner 60 is positioned horizontally over the opening 32 such that the opening 32, the liner 60, and the head 55 of the free end 54 of the suction hose 50 are vertically aligned and ready for use to accept the waste into the suction hose 50.

Also housed within the body 16 of the handbag 12 is the motor-vacuum 80, having a fan 82. The fan 82 provides a powerful suction force to the suction hose 50. The motor-vacuum 80 is electronically coupled to the battery unit 30 and thus in the preferred embodiment operates on AC battery power. Upon pressing the second button 24B, an electronic signal is sent to the control panel 28 which actuates the fan 82 of the motor-vacuum 80 to rotate rapidly and produce a strong inward flow of air for a predetermined amount of time through the suction hose 50. The inward flow of air thereby causes the liner 60, positioned over the opening 32 and waste, to draw inwardly such that the waste is contained within the liner 60, while the liner 60 completely protects the suction hose 50 from the waste. The inward suction of the liner 60 causes the liner to break at the perforated edges from the next successive liner 60. In alternate embodiments, it is contemplated that the user can control the suction of the fan 82 by continuously pressing the second button 24B to continually actuate the fan 82 to suction up air and waste thereby ensuring that all waste is picked-up through the opening 32. Once the liner 60 is pulled inwardly into the suction hose 50, a heater 83, also included in the motor-vacuum 80, simultaneously releases hot air into the suction hose 50. The heater 83 begins to release hot air into the suction hose for a predetermined amount of time after the liner 60 and waste are pulled inwardly into the suction hose 50. The hot air from the heater 83 reacts with the polymer plastic film of the liner 60, causing the liner 60 to shrink and wrap around the waste 61. Once the liner 60 is wrapped securely around the waste, the liner 60 and waste are ready to be disposed of into a trash receptacle. The fan 82 continues to provide inward flow of air until the third button 24C is pressed.

Upon pressing the third button 24C, an electronic signal is sent to the control panel 28 actuating the fan 82 of the motor-vacuum 80 to reverse air flow. The fan 82 then reverses to produce an outward flow of air, thereby causing the liner 60 with the waste wrapped therein to exit the device 10 through the opening 32 of the handbag 12 and be disposed into a trash receptacle.

Figure 3:
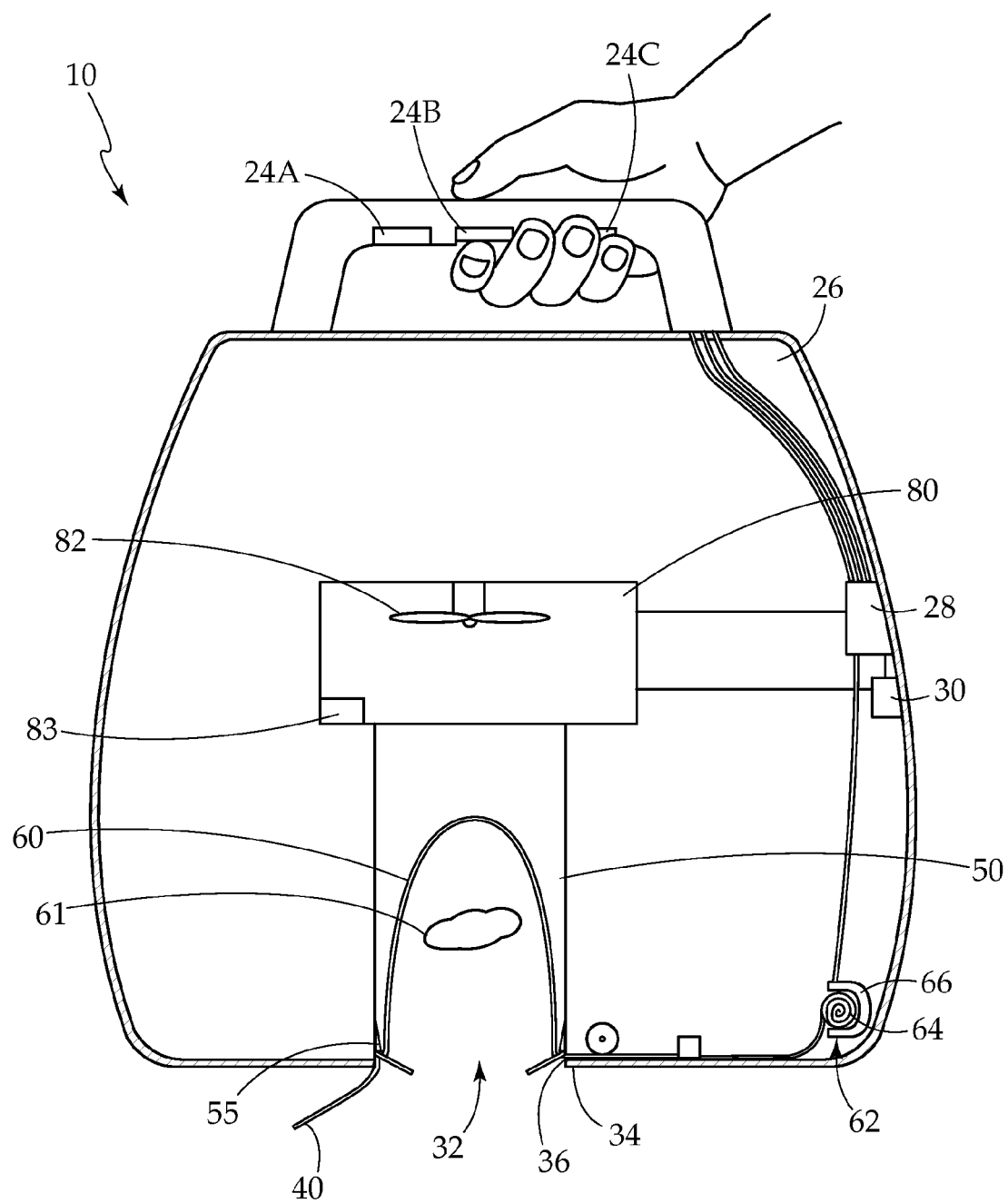
FIG. 3 is a cross-sectional view of the present invention in use, wherein the handbag is positioned directly above the waste to be cleaned up and the waste is suctioned into the handbag.

To efficiently and safely remove waste, the user first readies the device 10 for use, as shown in FIG. 3, by opening the door 40 and positioning the handbag 12 such that the opening 32 substantially surrounds the waste. Next, the user presses the first button 24A electronically signaling the control panel 28 and actuating the liner feeding mechanism 62 to position a liner 60 over the opening 32 of the handbag 12. The user then presses the second button 24B electronically signaling the control panel 28 to actuate the fan 83 of the motor-vacuum 80 to produce an inward flow of the air, or suction force. The suction causes the liner 60 to pull inwardly into the suction hose 50 such that the liner 60 completely insulates the suction hose 50 and the waste is contained within the liner 60 and separated from the suction hose 50. Immediately after the liner 60 is pulled inwardly into the suction hose 50, hot air is released from the heater 83 of the motor-vacuum 80. The heat causes the liner 60 to shrink and automatically wrap entirely around the waste. The inward suction caused by the fan 82 continues to hold the wrapped waste within the device until its ready to be discarded. Once the user is ready to dispose of the waste enclosed within the liner 60, the user presses the third button 24C sending an electronic signal to the control panel 28 and actuating the fan 82 of the motor-vacuum 80 to produce an outward flow of air, thereby releasing the liner 60 containing the waste through the opening 32 of the handbag 12 and into the trash receptacle.

In conclusion, herein is presented pet waste clean-up device. The invention is illustrated by example in the drawing figures, and throughout the written description. It should be understood that numerous variations are possible, while adhering to the inventive concept. Such variations are contemplated as being a part of the present invention.

What is claimed is:

1. A clean-up device for sanitarily and efficiently removing odiferous waste comprising:
   a substantially rectangular handbag having a body, a top end, an opposing bottom end having a substantially circular opening, and a handle having three buttons, wherein said top end is integrally coupled to said handle;
   a liner feeding mechanism housed within said body of said handbag having a plurality of polymer plastic film liners, a spool, a roller, a first bracket, and a second bracket, wherein said liners are removably rolled around said spool, wherein said spool is coupled to said first bracket, wherein said liners are threaded through said second bracket, wherein said spool rotates in conjunction with said roller to move one said liner horizontally across said opening of said handbag in position for use;
   a substantially cylindrical suction hose positionable within said body of said handbag having a coupled end and a free end, wherein said coupled end connects said suction hose to a motor vacuum, wherein said free end having a plastic head positionable adjacent said opening of said handbag;
   said motor vacuum housed within said body of said handbag including a fan and a heater, wherein said fan provides suction force and inwardly draws said liners into said handbag, wherein said heater simultaneously releases heat to said liners causing said liners to shrink and wrap around said waste, wherein said fan provides an outward flow of air to release said liner with said waste therein;
   a battery unit housed within said handbag for providing power to said fan and heater of said motor vacuum and said liner feeding mechanism; and
   a control panel housed within said body of said handbag, said control panel in electronic communication with said buttons of said handle, said spool and said first bracket of said liner feeding mechanism, said fan and said heater of said motor vacuum, and said battery unit for receiving signals from said buttons and actuating power from said battery unit to control said liner feeding mechanism and said motor vacuum.

2. The clean-up device of claim 1, wherein the substantial circular opening of the handbag has an outer lip having a hinge integrally coupled thereon, wherein said opening is sealed by a door, wherein said door is coupled to said outer lip of said opening via said hinge.

3. The clean-up device of claim 1, wherein said liners of said liner feeding mechanism having perforated edges, said liners removably couple one another via said perforated edges.

4. A method of using the clean-up device of claim 1 for sanitarily and efficiently removing odiferous waste comprising the steps of:
   (a) positioning the handbag on a ground surface such that the opening substantially surrounds the waste;
   (b) pressing the first button on the handle for electronically signaling the control panel to actuate the liner feeding mechanism and position one polymer plastic film liner over the opening of the handbag;
   (c) pressing the second button on the handle for electronically signaling the control panel to actuate the fan of the motor vacuum to produce an inward flow of air or suction force causing the liner to pull inwardly into the head of the suction hose such that the liner complete insulates the suction hose while the waste is contained therein, and simultaneously directing hot air to be released from the heater causing the liner to shrink and wrap entirely around the waste;
   (d) positioning the opening of the handbag adjacent a trash receptacle; and
   (e) pressing the third button on the handle for electronically signaling the control panel to reverse the inward flow of air from the fan to an outward flow of air, thereby releasing the liner with the waste out through the opening of the handbag and into a trash receptacle.

5. A clean-up device for sanitarily and efficiently removing odiferous waste comprising:
   a means for sanitarily housing waste within while simultaneously packaging waste for disposal, wherein said means for sanitarily housing waste further comprises:
      a substantial rectangular handbag having a body, top end, opposing bottom end having a substantially circular opening, and a handle having three buttons, wherein said top end is integrally coupled to said handle;
   a means for providing disposable polymer plastic film liners for containing said waste, wherein said means for providing disposable polymer plastic film liners further comprises:
      a liner feeding mechanism housed within said body of said handbag having a plurality of polymer plastic film liners, a spool, a roller, a first and second bracket, wherein said liners are removably rolled around said spool, wherein said spool is coupled to said first bracket, wherein said liners are threadthrough said second bracket, wherein said spool rotates in conjunction with said roller to move one said liner horizontally across said opening of said handbag in position for use; and a means for wrapping said waste within said liner.

6. The clean-up device of claim 5, wherein a means for wrapping waste within said liner further comprises:

a motor vacuum housed within said body of said handbag including a fan and a heater, wherein said fan provides suction force and inwardly draws said liners into said suction hose, wherein said heater simultaneously releases heat to said liners causing said liners to shrink and wrap around said waste, wherein said fan provides an outward flow of air to release said liner with said waste therein; and a substantially cylindrical suction hose positionable within said body of said handbag having a coupled end and a free end, wherein said coupled end connects said suction hose to said motor vacuum, wherein said free end having a plastic head positionable adjacent said opening of said handbag.

7. The clean-up device of claim 5, further comprising a means for supplying power to the device, wherein said means is a battery unit housed within said handbag for providing power to said fan and heater of said motor vacuum and said spool and said roller of said liner feeding mechanism.

8. The pet waste clean-up device of claim 5, further comprising a means for controlling said liner feeding mechanism, said motor vacuum, and said battery unit, wherein said means is a control panel housed within said body of said handbag, said control panel housed within said body of said handbag, said control panel is in electronic communication with said buttons of said handle, with said spool and said first bracket of said liner feeding mechanism, said fan and said heater of said motor vacuum, and said battery unit for receiving signals from said buttons and actuating power from said battery unit to control said liner feeding mechanism and said motor vacuum.

* * * * *